United States Patent [19]

Ross et al.

[11] 3,994,691

[45] Nov. 30, 1976

[54] APPARATUS FOR THE RECOVERY OF SULPHURIC ACID FROM INDUSTRIAL WASTE GASES

[75] Inventors: Sigmund L. Ross, New York, N.Y.; Oscar Shuffman, deceased, late of Scarsdale, N.Y., by Rose Shuffman, executrix

[73] Assignee: Rose Shuffman, Scarsdale, N.Y.

[22] Filed: July 24, 1975

[21] Appl. No.: 598,827

Related U.S. Application Data

[63] Continuation-in-part of Ser. No. 280,932, Aug. 15, 1972, abandoned.

[52] U.S. Cl. .................................. 23/283; 23/284; 55/90; 55/DIG. 30; 423/522
[51] Int. Cl.² ................ B01J 10/00; C01B 17/72; C01B 17/80
[58] Field of Search .............. 23/283, 284; 55/80, 55/90, 223, 259, DIG. 30

[56] References Cited
UNITED STATES PATENTS

| | | | |
|---|---|---|---|
| 3,273,316 | 9/1966 | Ross .......................................... | 55/90 |
| 3,494,099 | 2/1970 | Eng et al ............................ | 55/223 X |

Primary Examiner—Morris O. Wolk
Assistant Examiner—Michael S. Marcus
Attorney, Agent, or Firm—Richard K. Parsell

[57] ABSTRACT

Apparatus and method for the cryothermal recovery of sulfuric acid as predicated on the capture and conversion of sulfur dioxide contained in industrial waste gases. The apparatus includes a waste gas purifier comprising a chamber through which waste combustion gases are passed so as to traverse an ice bed filter means containing ice produced so as to contain entrained oxygen by an independent ice-making machine and chilled by the use of a cryogenic material, preferably liquid nitrogen. The incoming gases may be chilled by recirculating the gases that have passed through the ice filter bed so as to chill the portion of the chamber that is contacted by the incoming gases prior to their passage through the ice filter bed. Oxygen entrainment may be enhanced by the employment of a source of oxygen and the entrained oxygen at the low temperature provided by the ice bed reacts with sulfur dioxide contained in the waste combustion gases by transition through sulfur trioxide to sulfuric acid. The sulfuric acid is contained in melt from the ice filter bed and may be washed out with a spray of cold water.

19 Claims, 1 Drawing Figure

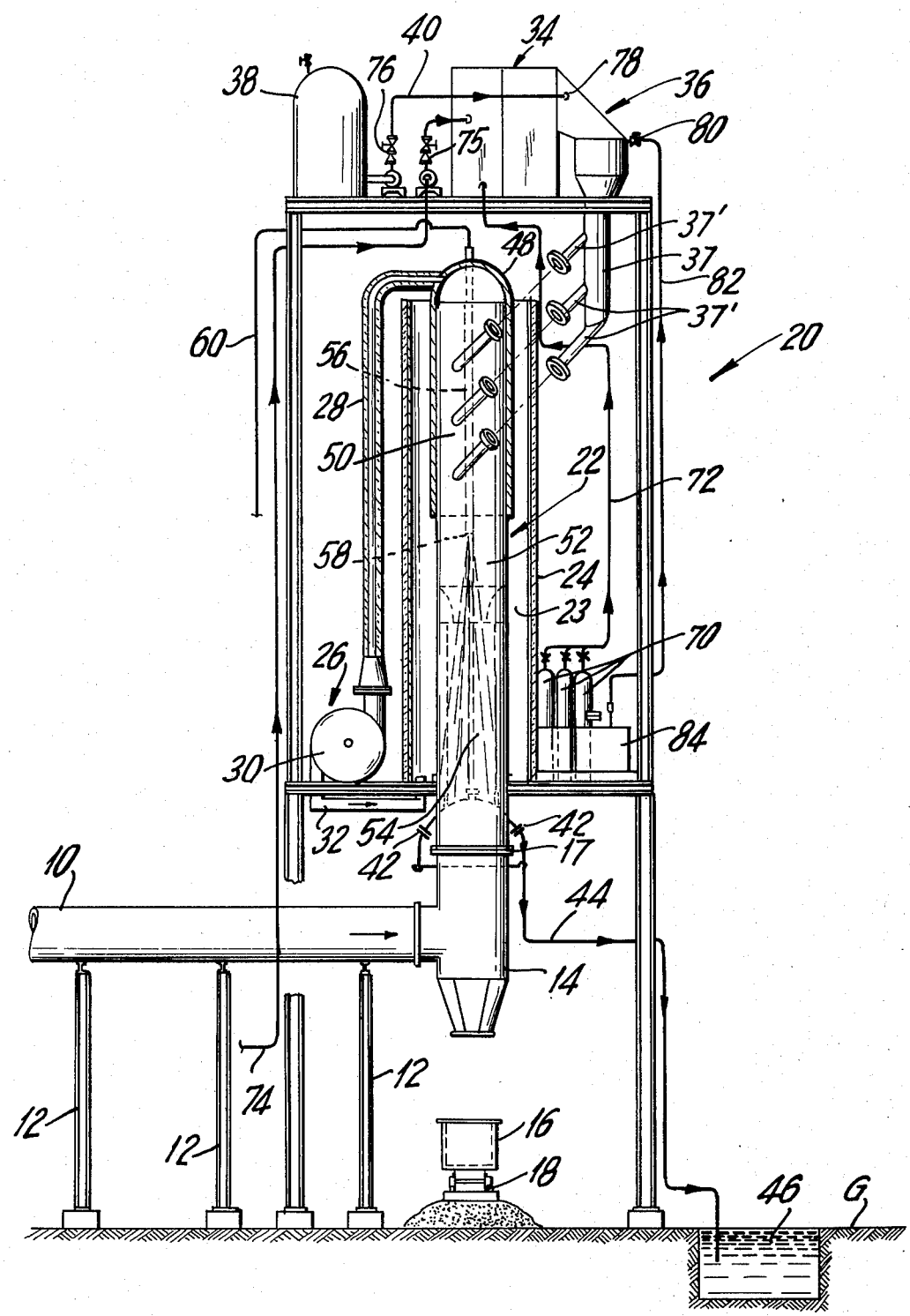

APPARATUS FOR THE RECOVERY OF SULPHURIC ACID FROM INDUSTRIAL WASTE GASES

This application is a continuation-in-part of application Ser. No. 280,932 filed Aug. 15, 1972 for "Method and Apparatus for Recovering Sulphuric Acid from Industrial Waste Gases", now abandoned.

The present invention relates to the cryothermal recovery of sulfuric acid from industrial waste gases containing sulfur dioxide. In addition, the invention relates to a method and apparatus of purifying industrial waste gases in order to avoid polluting the atmosphere, by the removal therefrom of solid particles entrained in the industrial waste gases and the removal of gaseous pollutants such as sulfur dioxide.

CROSS-REFERENCE TO RELATED APPLICATIONS

U.S. Pat. No. 3,273,316 entitled "INDUSTRIAL WASTE GAS PURIFIER METHOD", issued to Sigmund Lance Ross on Sept. 20, 1966, discloses an industrial waste gas purifier of the cryogenic type. In the method of said U.S. Pat. No. 3,273,316, industrial waste gases are purified by flowing the hot waste gases upwardly through the column of the waste gas purifier, and simultaneously spraying water downwardly through the column. Gaseous liquid nitrogen is gasified in contact with the water spray and expanded to form ice crystals from a portion of the water spray, and the ice crystals are separated from the ascending waste gases and the ascending gases contact masses of separated ice crytals. The method further includes the draining and removing of the melt of the ice crystals and the portion of the water spray which has not been converted into ice crystals, and exhausting the resulting gases which have thus been purified. The apparatus to achieve the method of U.S. Pat. No. 3,273,316 includes a column into the lower end of which the waste gases are admitted, means for turbulating the ascending gases, a thermal shock or chilling chamber thereabove, ice filter means above said chilling chamber, tangential nitrogen inlets in the thermal shock chamber, water spraying means at the top of the column in operative juxtaposition to the ice filter means, wash-out means at the bottom of the column and a gas discharge at the top of the column. It is noted that the ice formed within the waste gas purifier of U.S. Pat. No. 3,273,316 is formed in the purifier apparatus by the contact of the downwardly sprayed water and the liquid nitrogen which is sprayed into the chilling chamber of the purifier thereby causing the formation of discrete ice particles which are entrained in and rise with the ascending gases and are trapped by suitable baffle plates in order to form the ice mass against which the ascending gases contact.

As is readily apparent, in order to achieve supercooled ice crystals within the apparatus of U.S. Pat. No. 3,273,316, large quantities of liquid nitrogen are required for first crystallizing the water spray and then supercooling the ice crystals. This results in increased cost of operating the apparatus.

Industrial waste gases produced as the result of burning a combustible fuel such as coal, petroleum or gas, in addition to innocuous gases such as nitrogen and carbon dioxide, contain in varying amounts pollutants of the environment such as carbon monoxide, oxides of nitrogen, sulfur dioxide and some hydrocarbons. The method and apparatus of U.S. Pat. No. 3,273,316 are addressed basically to the problem of minimizing pollution of the atmosphere by these gaseous pollutants. Effectiveness in this regard is accomplished by generating ice crystals while surrounded by the waste gases so that the pollutants may be taken up by the nascent ice crystals while they are growing and while the ice crystals thus formed are carried up into an ice bed which by further contact with the waste gases accomplishes a thorough scavenging of the pollutants before the waste gases are discharged into the atmosphere. By causing the crystals to be formed cryogenically from a downwardly directed spray in countercurrent with upwardly directed waste gases, the portion of the water spray that is not converted into ice crystals by the cryogenic material is cooled to a temperature close to the freezing point of water and since this water is cold it serves to provide a shock chilling chamber for cooling the waste gases before the waste gases reach the zone wherein the ice crystals are formed. The water spray also contributes to the ionization of the pollutants so as to promote their deposition on the ice crystals, by frictional contact with the waste gases and by inducing flow of the waste gases so as to be in frictional contact with the column of the waste gas purifier.

Another related invention entitled "APPARATUS AND METHOD FOR RECOVERING PURE WATER FROM NATURAL SOURCES AND INDUSTRIAL POLLUTED WASTE SOURCES" is disclosed in application Ser. No. 280,933 filed concurrently with the subject application, by Sigmund Lance Ross and Oscar Shuffman, and relates to an apparatus and method for purifying industrial waste gases, and during the process of purifying the waste gases, a solution of polluted water is obtained which is subsequently passed through additional associated apparatus in order to recover comparatively pure water.

BACKGROUND AND SUMMARY OF THE INVENTION

The present invention is directed primarily to improved apparatus and method for the production of sulfuric acid although it also is the case that from the standpoint of removal of pollutants from waste industrial gases highly significant improvements in effectiveness have been obtained as compared with the disclosure in U.S. Pat. No. 3,273,316.

In the practice of the invention of U.S. Pat. No. 3,273,316 the conditions are not such as to be best suited for the production of sulfuric acid although some sulfuric acid may be inherently produced. However, such production is not mentioned in the patent and the conditions disclosed in said patent are not favorable to the production of sulfuric acid since the ice crystals are formed while in an atmosphere provided by the waste gases themselves which are low in oxygen as the result of having been used in the burning of the combustible material used as a fuel. The oxygen content in ordinary atmosphere is 20.95%, whereas in a typical waste industrial flue gas the oxygen becomes reduced to approximately 5%.

The carrying out of the cryogenic process for the production of sulfuric acid in accordance with the present invention is predicated on the following formulae:

$$SO_2 + H_2O = H_2SO_3$$

and $$H_2SO_3 + O = H_2SO_4$$

The improvements of the present invention utilize not only the phenomenon that the gaseous pollutants in waste gases are more effectively absorbed at low temperatures but also the phenomenon that the aforesaid reactions, and more especially the reaction whereby $H_2SO_3$ reacts with oxygen to produce $H_2SO_4$, is promoted by using cryogenically chilled ice produced so as to be high in entrained oxygen. While most gases and other foreign materials are rejected upon conversion of water to ice, oxygen, under ice-forming conditions in an independent ice-making machine, becomes entrained to the extent of about 13.4% or more which supplements the oxygen content of the air. This entrained oxygen is released when the oxygen-containing ice crystals are melted while in contact with the waste combustion gases so as to be available for the final reaction to produce the sulfuric acid under the favorable conditions for said reaction provided by the low temperature. The principal aspect of this invention, therefore, involves the utilization of the aforesaid phenomena in combination whereby ice crystals formed by an independent ice-making machine so as to favor high oxygen entrainment are cryogenically supercooled and contacted with the waste gases, thereby not only promoting the taking up of waste gas pollutants by the use of low temperatures but also promoting the conversion of any sulfur dioxide to sulfuric acid by reaction with a high content entrained oxygen released during melting of the ice crystals. By this invention, therefore, highly effective method and apparatus are afforded not only for effectively removing pollutants from waste combustion gases but also for providing a new and highly significant improvement in the conversion of the sulfur dioxide content of such gases into sulfuric acid.

It also is a feature of preferred practice of this invention that the capacity to convert the sulfur dioxide into sulfuric acid may be still further improved by the enhancement of the entrained oxygen as produced by an independent ice-making machine by the employment of oxygen.

It is a further feature of preferred practice of this invention to include a small amount of manganese sulfate in the ice crystals, thereby promoting the solubility of sulfur dioxide in water produced by the melting of the ice with resultant increased conversion to sulfuric acid by reaction with oxygen liberated from the ice crystals.

This invention whereby the ice crystals are separately formed under conditions favorable to oxygen entrainment followed by cryogenic chilling and contact with waste combustion gases also is of advantage in that it lends itself to better distribution of ice crystals in the ice filter bed that is contacted by the waste gases. In practicing the invention disclosed in U.S. Pat. No. 3,273,316 the ice crystals are formed primarily in the region below the ice filter bed formed therefrom and are carried upwardly as they are formed in the downwardly projected water spray by entrainment with the upward flow of waste gases so as to collect on the underside of the lowermost of the baffle supports for holding the ice crystals in place with passage of some of the ice crystals through the central opening in the lowermost baffle support for continued travel to the baffle support means higher up in the column. While this system is effective in the removal of pollutants, nevertheless by forming ice crystals in a separate ice-making machine and by conveying them to the filter bed means so as to be disposed on top of a suitable foraminous support for the ice filter bed better distribution of the ice crystals is provided for effective contact with the waste gases with resultant improved conditions for the production of sulfuric acid. Further in this connection, it is to be noted that by supplying cryogenically chilled ice crystals formed by means of an independent or separate ice-making machine as distinguished from injecting a liquid cryogenic material into a downward spray of water as disclosed in U.S. Pat. No. 3,273,316 the foraminous support for the ice crystal filter bed is permitted to extend completely across the chamber traversed by the waste gasses, thereby providing positive control whereby all the waste gases must pass through the ice filter bed with good distribution thereacross. A further advantage resulting from the use of an independent ice-making machine is that a greater surface area of ice crystals for contact with the waste gases is made possible with resultant enhanced output of sulfuric acid due to the fact that the improvement of the present invention is not subject to the design limitations that are imposed when ice crystals are formed by the injection of a cryogenic liquid into a downwardly directed spray of water.

It is of further advantage in the practice of the present invention that better control of ice crystal size is possible. When ice crystals are formed by injecting a cryogenic liquid into a downwardy directed spray of water as disclosed in U.S. Pat. No. 3,273,316 the ice crystals that are formed are relatively small and may be compared with snow in that they are sufficiently small to be carried upwardly by the waste gases so as to become collected on the underside of the baffle supports for the ice filter bed means. Under these conditions a certain amount of bridging between the ice crystals occurs which interferes with travel of the waste gases through the ice bed. By initially forming the ice crystals in an independent ice-making machine the size and shape may be better controlled. While some bridging may occur between such preformed crystals, it is much less than that which occurs when using the method and apparatus disclosed in U.S. Pat. No. 3,273,316, thereby obtaining better contact with the waste gases and correspondingly increased effectiveness in the production of sulfuric acid.

The production of sulfuric acid is further improved as compared with utilization of the method and apparatus disclosed in U.S. Pat. No. 3,273,316 by recirculating the waste gases which have been chilled by passage through the ice filter means so as to pass through a jacket which surrounds the chamber below the ice filter bed so as to effectively chill the inner surface of this chamber with which the incoming gases make contact. This is significant not only from the standpoint of conserving cryogenic material but also from the standpoint of decreasing the buoyancy of the gases with attendant more effective separation of impurities therefrom, including the removal of sulfur dioxide and its conversion to sulfuric acid.

One of the highly significant practical advantages of the method and apparatus of the present invention as compared with the disclosure in U.S. Pat. No. 3,273,316 is that great savings are made possible as regards the amount of cryogenic material that is used. While both employ a cryogenic material, such as liquid nitrogen, the calculated amount of cryogenic material which is used in the practice of the present invention is only about half the amount that is employed when utilizing the invention disclosed in U.S. Pat. No. 3,273,316 for treating a corresponding amount of waste combustion gases. As applied to the production of sulfuric acid, this means that for a given amount of liquid nitrogen, for example, the amount of waste gases treated may be roughly doubled as compared with that which occurs in the practice of the invention disclosed in U.S. Pat. No. 3,273,316. This is highly significant from the standpoint of economics in a commercial operation since the supply of cryogenic material is the principal cost consideration.

The apparatus of the subject invention for recovering sulfuric acid from industrial waste gases containing sulfur dioxide so as to include the several improvements of this invention comprises a waste gas purifier of the cryogenic type, and a cylindrical insulated jacket spaced from the gas purifier thereby defining a passageway; means for cirulation waste gases from the output or upper end of the waste gas purifier to the lower end of said passageway; separate means for producing ice for input to the waste gas purifier; and cryogenic means for injecting cryogenic materials into the ice preferably prior to its admission to the waste gas purifier. In operation, as the waste gases are passed through the purifier, the sulfur dioxide therein is separated from the waste gases and reacts with the water and oxygen within an ice filter portion of the waste gas purifier to produce sulfuric acid that is collected at the lower end of the waste gas purifier. The remaining gases are circulated through the top of the purifier, through the circulating means, and then through the passageway preparatory to exhausting to the atmosphere. As the cooled waste gases pass through the passageway they function as a thermal dynamic drive for cooling the waste gases passing through the industrial waste purifier. The method of the subject invention for recovering sulfuric acid comprises passing the waste gases through a waste gas purifier of the cryogenic type so as to expose the sulfur dioxide to tn enriched oxygen atmosphere and water resulting from liberation of oxygen entrained in the ice for producing sulfuric acid.

In obtaining the several improvements of the subject invention, the process of the subject invention operates in conjunction with the apparatus in such manner that as the waste gases enter into the industrial waste gas purifier, the gases are chilled down by a spray of water that is at a temperature close to freezing and is pressurized. The descending water spray effectively forces the ascending hot waste gases against the interior walls of the vertical extending column of the industrial waste gas purifier, whereby the gases are contacted with the interior walls of the column. The frictional contact of the industrial waste gases against the wall effectively ionizes the gases. Ionization of the gases also is effected because of the friction of the particulate matter within the gases, as well as the changes of density due to the temperature variation of the industrial waste gas as it ascends and is simultaneously cooled, and also by the condensation of the water vapor in the industrial waste gas. Ionization of the waste gases is important in that it greatly aids in the creation of precipitation within the purifier. This is of particular importance with respect to the first of the aforesaid two formaulas. As background, it is known that in the scrubbing of sulfur dioxide from flue gases using industrially available water, the apparent solubility is greater than indicated from the equilibrium values of sulfur dioxide with pure water. This excess solubility indicates that a secondary reaction takes place after the flue gases dissolve or interact with the alkaline impurities, or with dissolved oxygen which results in the formation of sulfuric acid. It is known that some metallic ions act as catalysts for absorbing sulfur dioxide by water. For example, manganese sulphate, in concentrations as low as 0.0028 p.p.m., increase the solubility of sulfur dioxide in water by 600%. Hence, when a mixture of sulfur dioxide in air is bubbled through water containing manganese ions as a catalyst, a 30% sulfuric acid concentration is obtained. In order to obtain the same effect as the provision of manganese sulphate, the subject invention provides an arrangement wherein the flue gases are ionized upon entering the waste gas purifier in order to increase the solubility of sulfur dioxide with water. As previously noted, ionization of the gases is achieved by forcing the waste gases in frictional contact with the side walls of the purifier, thereby causing the waste gases to become ionized during their ascent through the ice bed portion of the purifier.

Another important aspect of the subject invention is the second formula cited above as part of the subject cryothermal process, and in particular, the subject means for providing an enriched oxygen atmosphere to the ascending industrial waste gases as they pass through the subject apparatus. As part of the subject apparatus, the industrial gases are caused to pass through an ice bed or ice filter means, and means are provided for insuring the inclusion of a sufficient amount of oxygen within the ice bed for enabling the reaction of $H_2SO_3$ and oxygen to form sulfuric acid. More particularly, the subject apparatus includes means for insuring the inclusion of oxygen molecules within the crystals making up the ice bed. As is known, when ice is formed, the gaseous inclusions found in it originate either from the atmosphere or from the freezing of water. Thus, when water freezes, gases dissolved in it separate completely out of the solution and form bubble inclusions with a new quantitative ratio of the gases. The self-generating or autogenous air of congelation ice formed from completely fresh water will be entrained by oxygen to the extent of 13.4%, whereas carbon dioxide will be found to the extent of 1.7%. Consequently, the entrained gas will be correspondingly deprived of nitrogen and the inert gases. Since the percentage of oxygen in the air (atmospheric air) is 20.95%, to this must be added the enrichment percentages of oxygen found in ice when formed. These percentages will vary depending on the particular environmental conditions existing, such as the temperature of the ice, pressure, etc., and have been measured in different locations as follows: Alpine glacier ice has 22.7% oxygen in the air entrained in ice; Spitzbergen glacier ice, 20.4%; and Barents Sea 24.0 – 26.3%. In addition it should be noted that various other parameters influence the amount of a foreign body within an ice crystal, such as the rate of crystallization, the size of the foreign body, the magnitude of the forces of surface tension between the body, the liquid and the ice crystal. In addition, the rate at which the ice freezes also controls the extent of the inclusions in the ice.

In the subject invention, oxygen enrichment of the ice is achieved by means of an ice-making machine, which produces ice crystals that are to be conveyed to the ice filter means or ice bed portion of the waste gas purifier. The ice-making machine is provided with fresh water, and oxygen in order to produce oxygenated ice crystals. While the crystals are being transferred from the ice-making means to the ice bed, super-cooling of the commercially manufactured ice crystals is accomplished by the spraying of the crystals with a cryogenic material. The chute is pressurized with either pure oxygen or compressed air to aid in the conveyance of the supercooled crystals to the ice bed.

BRIEF DESCRIPTION OF THE DRAWING

The FIGURE is a detailed view, partially in section, of apparatus that is illustrative of the improved industrial waste gas apparatus embodying the subject invention.

DETAILED DESCRIPTION

Referring to the FIGURE industrial waste gases from an industrial plant (not shown) are conducted through a large exhaust duct 10 which is supported by columns 12 to a T-shaped duct coupling 14, the arms of which are vertically extending. The lower arm portion of coupling 14 is open and is disposed above a collection means 16 that is preferably track mounted as at 18 in order to collect the solid particulate matter which is removed from the industrial waste gases. The opposite end of the coupling 14 is connected as at 17 to the industrial waste gas purifier apparatus 20 of the subject invention.

The industrial waste gas purifier apparatus 20 as shown comprises a combination of several devices, one of which is an industrial waste gas purifier 22 of the cryogenic type, somewhat along the lines of the device disclosed in U.S. Pat. No. 3,273,316, entitled "INDUSTRIAL WASTE GAS PURIFIER METHOD" by Sigmund Lance Ross. In addition, the apparatus 20 includes a cylindrical insulated jacket 24 which is spaced from and surrounding said waste gas purifier 22 so as to define a vertically extending passageway 23 therebetween. Circulating means 26 connect to the upper or discharge end of the waste gas purifier 22, via insulated conduit 28 and, after the waste gases are passed through fan 30 of the circulating means 26, they are conducted via ducting 32 to the lower end of the passageway 23. The apparatus 20 further includes means for producing ice 34 which is preferably a commercial ice-making machine, with the ice being conveyed via conduit and manifold means 36 to the upper portion of the waste gas purifier 22. The apparatus further includes cryogenic means 38, preferably liquid nitrogen, that are connected to the conduit means 36 via conduit 40 in order to inject cryogenic material onto the particles of ice from the ice machine 34, preparatory to the introduction thereof of the ice filter portion of the waste gas purifier, as more fully described hereinafter.

Disposed at the lower end of the waste gas purifier 22 are a plurality of liquid wash-out nozzles 42 that are connected via a wash-out conduit 44 to an acid settling tank 46 disposed in the ground G.

The industrial waste gas purifier 22 comprises an elongated column, the upper end of which defines the ice bed chamber and is closed except for the connection to the insulated conduit 28, with the upper end of the purifier being insulated, as designated by numeral 48. Disposed within the ice bed chamber is an ice filter means defining an ice bed, designated by numeral 50, while a conditioning chamber is disposed below said ice bed which comprises a thermal shock chilling chamber region 52 and the turbulating chamber portion 54 where the industrial waste gases are deflected and directed so as to create substantial turbulence in the ascending stream of industrial waste gases.

Extending through the ice bed or ice filter means 50 is a conduit 56 which terminates at a water spray nozzle means 58 disposed in operative juxtaposition to the thermal shock chilling chamber, and which is connected via a conduit 60 to a source of water, preferably impure water (not shown).

The ice bed or ice filter means portion 50 of the waste gas purifier 22 comprises a series of baffles that extend transversely completely cross the column and that are adapted for holding supercooled ice crystals through which the ascending industrial waste gases pass. The supply of ice crystals is provided to the ice bed 50 by means of the ice-producing means 34 which, as mentioned, may be a commercial ice machine. In order to insure sufficient oxygen inclusions in the commercially manufactured ice crystals, the fresh water which is employed in the commercial ice machine 34 may be oxygenated. For this purpose, a plurality of oxygen tanks 70 are provided and are connected via line 72 to the ice machine 34. Also connected to the ice machine is a source of fresh water (not shown) connected via line 74 and pump 75 to the ice machine 34.

Prior to the introduction of the ice crystals to the ice bed, th apparatus shown includes means for supercooling of the commercially manufactured ice crystals. This is accomplished by means of connecting the cryogenic storage means 38 in the form of a cryogenic storage tank via a cryogenic supply pump 76 to the conduit 36 at the cryogenic injection point, designated by numeral 78. From the conduit means 36, the supercooled ice crystals which have sufficient oxygen inclusions are passed through an ice crystal manifold portion 37 of conduit means 36, and thence through distribution lines 37' to the various baffles forming a portion of the ice bed or ice filter means disposed within the waste gas purifier 22. In order to aid the passage of ice crystals that are supercooled through the ducting 36 and the manifold 37, compressed air is injected into the manifold 36 as at 80, and is provided thereto via line 82 from air compressor 84. Alternatively, compressed oxygen may be employed in lieu of compressed air.

In operation, industrial waste gases, including sulfur dioxide from an industrial plant are conveyed via ducting 10 to the T-shaped coupling 14. The solid particulate matter falls through the lower end of coupling 14 into the collection means for disposal. The remaining, hot industrial waste gases flow upwadly through the vertically extending column of the industrial waste gas purifier 22. Upon entering the industrial gas purifier, the waste gases are turbulated in the turbulating chamber 54, and the impure water being sprayed from the water spraying means 58 effectively forces the ascending waste gases against and in frictional contact with the interior wall of the column 22. Preferably, the impure water from spray 58 is at a temperature very close to freezing and is sprayed in a dense, large volume spray under high pressure, thereby being more efficient in forcing the industrial waste gases against the interior wall of the column. At the same time, industrial waste gases which have reached the upper end of the column are withdrawn by operation of the fan 30 through the insulated conduit 28 and thence through the conduit 32 for passage through the passageway 23. The recirculated gases are cool relative to the waste gases within the column 23, and the temperature differential provides a thermodynamic drive which causes the ascending waste gases within the purifier 22 to rapidly lose heat energy. In addition, by being forced against the interior wall of the column 22, and being in contact with the descending water spray, the ascending industrial waste gases become ionized by friction. This is of particular importance with respect to increasing the solubility of the sulfur dioxide gas in water when the industrial waste gases reach the ice bed 50.

As the industrial waste gases continue to ascend and lose heat by conduction through the outer wall of the waste gas purifier column, and by contact with the descending cold water spray, the buoyancy of the gases is rapidly reduced, and heavier, entrained particulate matter is precipitated out.

The ice bed is replenished with supercooled ice crystals that are formed in the ice machine 34 and sprayed with cryogenic material. The ice machine is provided with fresh water via supply line 74 pumped through pump 75, and, in addition, oxygen is provided to the commercial ice machine 34 via supply 70 and conduit 72. The provision of oxygen to the ice machine 34 insures sufficient oxygen inclusion in the commercially manufactured ice crystals. It is also possible that, in lieu of employing gaseous oxygen, liquid oxygen may be used both as an oxygenation souce, and also as an ice crystal chilling source. Vaporization of the liquid oxygen will insure that some oxygen inclusions will be found on the crystal surfaces.

Supercooling of the commercially manufactured ice crystals that are oxygenated, is accomplished by spraying them as they emerge from the commercial ice maker into the distribution duct 36 with a cryogenic fluid, preferably liquid nitrogen. The crystals emerging from the ice maker fall into the chute-like duct 36, and during their fall they are sprayed with the liquid nitrogen from source 38 via pump 76 and line 40 at injection point 78. In addition, the chute 36 is pressurized with compressed air via source 84 and line 82, or alternatively by compressed oxygen. Also, the compressed air may be substituted with pressurized nitrogen vapor, possibly that given off by the liquid nitrogen as it vaporizes. It is to be noted that the industrial waste gas apparatus disclosed in U.S. Pat. No. 3,273,316 includes an arrangement in which it was first necessary to cool the water sprayed in the purifier down to freezing temperature and then to supercool the ice crystals formed therein from freezing temperature to a frozen state approximately 60° F. below zero. In order to effect this supercooling, nitrogen is sprayed into the thermal shock chamber. On the other hand, in the apparatus of the subject invention the amount of liquid nitrogen to chill down an already manufactured ice crystal, as manufactured by ice maker 34, will be considerably less as mentioned hereinabove, and, therefore, in light of the cost of liquid nitrogen, the cost of operating the apparatus of the subject invention will be substantially less than operating the apparatus of U.S. Pat. No. 3,273,316.

As the ascending waste gases approach the underside of the ice bed, the particulate matter still entrained therein function as condensation nuclei. The condensation increases until a heavy precipitative mist develops, resulting from the melting of the ice bed, thereby releasing the oxygen molecules that are included within the ice, and upon contacting the sulfur dioxide in the gases, converts it to sulfur trioxide. It is to be noted that because the mist is very close to the freezing point, the sulfur dioxide becomes more soluble in the water droplets making up the mist.

The operation of the fan 30 continualy withdraws the ascending waste gases from the purifier unit, and as the ascending gases contact the ice crystals making up the ice bed, solubility of most of the gases of the industrial waste gases in water increases as the temperature drops. But as the ice crystals absorb some of the heat energy left in the gases, they release the oxygen molecules which convert the sulfur trioxide to sulfuric acid.

The sulfuric acid condenses and flows through the bottom of the column of the industrial waste gas purifier and the liquid sulfuric acid is collected by the wash-out nozzles 42 and conveyed via the wash-out line 44 to the acid settling tank 46.

In order to increase the oxygenation of the ice crystals, the fresh water which is provided to the ice-producing means 34 may include from 500- to 600-mesh manganese sulphate, or other pertinent catalysts, upon which sulfur trioxide can act to help in its conversion to sulfuric acid.

While the practice of this invention has been described in connection with apparatus that takes advantage of the various features and improvements of this invention as hereinabove disclosed, it is to be understood that this has been done for the purpose of illustrating preferred practice of the invention. Moreover, it is to be understood that the features and improvements of this invention may be availed of singly or in subcombinations as well as in the entire preferred combination. Thus, the principal feature of the present invention is that of causing waste combustion gases during travel through an ice bed chamber to traverse a bed of ice crystals that are produced by an independent or separate ice-making machine and that are cryogenically supercooled. By the terms "separate" or "independent" ice-making machine it is to be understood that the ice-making machine is a machine such as a conventional ice-making machine, for example, that is operable independently and as a separate ice production unit for supplying the ice crystals high in entrained oxygen that are cryogenically supercooled and provided in the ice bed that is traversed by the waste combustion gases while travelling through the ice bed chamber as distinguished from the production of ice crystals for the ice bed by cryogenically converting to ice crystals water droplets comprised in a water spray within either the conditioning chamber or ice bed chamber traversed by the waste gases so that the ice crystals so produced become carried by the waste gases into an ice bed supported by baffles as disclosed in U.S. Pat. No. 3,273,316. For example, a conventional refrigerating cycle is suitable wherein a gas such as freon is compressed, cooled, and expanded to low temperature to cool a surface in contact with water to a temperature sufficiently low to convert the water into ice. By the employment of the independent or separate ice-making machine, the improvements as aforesaid are made possible as regards improved content of entrained oxygen, improved disposition of the ice in the ice bed in relation to the chamber traversed by the waste gases, improved control of ice crystal size, improved control of traverse by the waste gases through the ice bed, and greatly improved economy as regards the amount of cryogenic material required for a given output. Moreover, whenever the independent ice-making machine is employed and the ice therefrom is cryogenically supercooled for use in the ice bed traversed by the waste combustion gases sulfur dioxide in the waste combustion gases is taken up by the ice as it is melted by the waste combustion gases traversing therethrough and sulfuric acid is produced that is removed with the melt. From this standpoint it is not necessarily the case that the waste gases be directed upwardly in the chamber containing the ice filter bed, although this is distinctly preferable. The travel may be horizontal or down or in any other direction. All that is required is that the waste gases traverse the ice bed and that some means be provided for collecting and withdrawing the melt that drains from the ice bed and for withdrawing it.

The other features and aspects of the invention provide preferred operating conditions. Thus, it is possible to dispense with chilling means for chilling the waste gases prior to their travel through the ice bed, especially if the lack of chilling is compensated for by increasing the thickness of the ice bed traversed by the waste gases, although as practiced in this manner the overall operation would be less economical.

When the waste gases are subjected to chilling it is preferable to accomplish the chilling by the use of a water spray which produces a spray of water which directly contacts the waste gases prior to their passage through the ice bed since this effectively cools the gases and at the same time by frictional contact accomplishes ionization of the gases in a manner that aids in the absorption of pollutants on the surfaces of the melting ice crystals in the ice bed. Moreover, by directing the spray downwardly or otherwise countercurrent to the flow of waste gases, the gas flow can be directionalized within the conditioning chamber so as to be urged into frictional contact with the inner surface of the wall of the conditioning chamber, thereby contributing to the ionization of the waste gases prior to their passage through the ice bed. However, the waste gases may be chilled by other expedients which may be employed either alone or in conjunction with other chilling means. Mention already has been made herein of contributing to the chilling of the waste gases by recirculating the waste gases that remain after passage through the ice bed so as to pass through a jacket that surrounds the conditioning chamber, thereby cooling the wall of the conditioning chamber, the surface of which is contacted by waste gases during passage therethrough. Other gas-chilling means also may be used such as a heat exchange coil which is disposed in the path of travel of the waste gases through the conditioning chamber and which is kept cold by expansion of a compressed refrigerating gas such as freon. For example, the compressor for the refrigerating gas used in the independent ice-making machine also could supply under proper control a quantity of compressed refrigerating gas in an amount necessary to keep the chilling coil at a desired low temperature.

When a spray of water is not employed in the conditioning chamber, the washing out of the melt that contains dissolved sulfuric acid may be assisted by water supplied by some other means.

It also is the case that the employment of turbulator means to produce turbulence in the gases travelling through the conditioning chamber, while preferable, is not essential to the production of sulfuric acid since the production of sulfuric acid is the functional result of contacting the waste gases containing sulfur dioxide with the cryogenically chilled ice crystals produced by the independent ice-making machine whereby the sulfur dioxide is absorbed and reacts with the oxygen rendered available by the melting of the ice crystals produced with entrained oxygen by the independent ice-making machine. However, improved conditions favoring the ionization of the gases and their absorption by the melting ice crystals are afforded by the employment of the turbulator means.

As aforesaid, it is desirable but not essential that the flow of waste gases through the conditioning chamber be directionalized so as to urge them into frictional contact with the inner surface of the conditioning chamber. It already has been disclosed herein that a spray of water such as a downwardly directed spray of water countercurrent to upward flow of waste gases through the conditioning chamber is preferable in this regard and also serves as a chilling means for the waste gases. However, less advantageously mechanical baffle means or turbulator means may be used which urges the gas travelling through the conditioning chamber against the inner surface thereof.

While the ice produced by the independent ice-making machine and introduced into the ice bed chamber to form an ice bed has been referred to as being in the form of ice crystals, it is to be understood that this has been done because ice inherently is a crystalline material and because one of the phenomena availed of in the practice of this invention is the entrainment of an amount of oxygen of the order hereinabove mentioned during the freezing of water to form crystalline ice. The usage of the ice particles is not critical so long as the ice crystals permit the waste gases to flow through the ice bed at a rate commensurate with their supply. Likewise, the pieces of ice should not be so large as to require an undesirably thick ice bed in order to achieve the desired contact with the ice. Particles of the order of ¼ inch to ¾ max. inch in maximum dimensions ordinarily are suitable. However, in any case where the waste gases containing sulfur dioxide are caused to traverse a bed of ice crystals that have been cryogenically supercooled, there is substantial absorption of the sulfur dioxide and conversion thereof to sulfuric acid by oxygen released from the melting ice crystals.

It is not essential that the supercooling of the ice crystals be accomplished prior to introducing them into the ice bed chamber to form an ice bed. The application of the cryogenic material to the ice crystals while the ice crystals are in a conduit feeding into the ice bed chamber is merely a preferred way of accomplishing the cryogenic chilling. The cryogenic chilling also may be accomplished, although somewhat less desirably, by causing a cryogenic material to be injected directly into the ice crystals after they have been deposited in the ice bed. For example, this could be done intermittently since after injection of a quantity of liquid nitrogen the ice crystals are cooled much below freezing point of water and at least in the upper portion of the ice bed a substantial period of time will elapse before another injection of liquid nitrogen is required or until an additional quantity of ice crystals is introduced into the ice bed chamber from the independent ice-making machine.

While there are many important advantages that result from the employment of an independent ice-making machine and cryogenically supercooling the ice crystals so produced, it is to be understood that this does not exclude the possibility of injecting a cryogenic material into a water spray in the conditioning chamber so as to supplement the cryogenically supercooled ice crystals produced by the independent ice-making machine, although this practice is not recommended since it impairs virtually all of the advantages of the practice of this invention which are afforded by the employment of an independent ice-making machine and cryogenically supercooling the ice made in this way.

While the invention has been described and exemplified as employed for the production of sulfuric acid, most of the features and aspects of the invention which represent improvements in the manufacture of sulfuric acid likewise are of advantage when these features and aspects of the invention are employed with the principal objective of removing pollutants from waste gases. To the extent that sulfur dioxide is contained in the waste gases that are treated, there will be production of sulfuric acid by reaction of the sulfur dioxide with the oxygen liberated from the melting of the cryogenically chilled ice crystals. However, this invention has application in the treatment of waste gases to remove pollutants therefrom when the waste gases do not contain significant quantities of sulfur dioxide. For example, in the production of polyvinyl chloride gases are evolved that are believed to be conducive to cancer of the liver which in most cases at least is fatal after having been contracted. The invention of the present application may be availed of to minimize the occurrence of such pollutants from waste industrial gases and likewise is of utility in the removal of other objectionable pollutants such as oxides of nitrogen, carbon monoxide, and hydrocarbons.

What is claimed is:

1. Apparatus for recovering sulfuric acid from industrial waste gases including sulfur dioxide comprising:
   a vertically extending waste gas purifier of the cryogenic type including a column into the lower end of which the waste gases are admitted, a thermal shock chilling chamber located intermediate the length of the column, ice filter means above said chilling chamber, water spraying means in operative juxtaposition to the thermal shock chilling chamber, washout means located adjacent the bottom of the column, and a gas discharge adjacent the top of the column;
   a cylindrical insulated jacket spaced from and surrounding said waste gas purifier so as to define a passageway therebetween;
   circulating means connected to the gas discharge portion of the waste gas purifier, and to said passageway in the vicinity of the lower end of the waste gas purifier, the opposite end of said passageway exhausting to the atmosphere;
   means for producing ice containing occluded oxygen;
   conduit and manifold means connecting said means for producing ice to the ice filter of the waste gas purifier; and
   cryogenic means connected to the conduit means for injecting cryogenic material into the ice prior to the admission thereof to the ice filter means of said waste gas purifier whereby, as waste gases are passed through the waste gas purifier, the sulfur dioxide therein is separated from the waste gases and reacts with the water and oxygen evolved from ice crystals within the ice filter means to produce sulfuric acid that is collected at the washout means of the waste gas purifier, with the remaining gases being circulated through the top of said waste gas purifier, through the circulating means, and thence through the passageway preparatory to exhaust to the atmosphere, with said gases passing through the passageway being operative to absorb heat from the waste gases ascending in the waste gas purifier.

2. Apparatus for recovering sulfuric acid as in claim 1 which comprises means for exhausting particulate solid matter contained in the waste gases through the lower end of the column of said waste gas purifier for collection in a container.

3. Apparatus for recovering sulfuric acid as in claim 1 wherein compressed air means are connected to said conduit and manifold means to pressurize the latter while supercooled ice crystals are being conducted to the ice filter means.

4. Apparatus for recovering sulfuric acid as in claim 1 wherein said circulating means includes an insulated duct connected to the gas discharge portion of the waste gas purifier, and an exhaust fan connected to said insulated duct for forcibly withdrawing waste gases from the purifier, and a second duct extended between said exhaust fan and said passageway adjacent the lower end of the waste gas purifier.

5. Apparatus for recovering sulfuric acid as in claim 1 wherein the upper portion of the column of the waste gas purifier adjacent the ice filter means is insulated.

6. Apparatus for recovering sulfuric acid as in claim 1 wherein the cryogenic means comprises a source of liquid nitrogen.

7. Apparatus for recovering sulfuric acid as in claim 1 wherein pressurized oxygen is provided to said conduit and manifold means to pressurize the latter while supercooled ice crystals are being conducted to the ice filter means.

8. Apparatus for recovering sulfuric acid as in claim 1 further including means connected to the ice making means for supplying oxygen to said machine so as to increase the oxygen inclusion within the ice produced by said ice-making machine.

9. Apparatus for recovering sulfuric acid as in claim 8 wherein the ice producing means is further provided with minute quantities of manganese sulphate to increase the solubility of the sulfur dioxide.

10. Apparatus for the manufacture of sulfuric acid which comprises an ice bed chamber, an ice making machine, conveying means for conveying ice crystals produced by said ice making machine so as to be introduced into said ice bed chamber, foraminous support means within said ice bed chamber for supporting ice crystals introduced into said ice bed chamber by said conveying means to form a bed of ice crystals within said ice bed chamber, cryogenic means connected to said conveying means for supercooling said ice crystals so that said ice crystals occur in said supercooled condition in said ice bed, means for directing waste gases containing sulfur oxide through said ice bed in contact with the surfaces of the ice crystals in said bed thereby melting some of the ice crystals with attendant drainage of resulting aqueous melt from residual ice crystals retained on said foraminous support whereby sulfur dioxide contained in said waste gases is absorbed from said gases during their passage through the ice bed, and means below said ice bed for collecting and withdrawing aqueous melt that drains from said ice bed, said ice making machine being separated from said ice bed chamber and being a machine that produces ice crystals by the freezing of water while in out-of-contact relation with said waste gases and with inclusion in said ice crystals of occluded oxygen which is retained in the supercooled ice crystals that are introduced into said ice bed chamber and that form said bed and which is released by the melting of ice crystals contained in said bed during passage of said gases through said bed and reacts upon release with sulfur dioxide absorbed by said bed during travel of said gases through said bed to form sulfuric acid thereby producing sulfuric acid that is contained in the melt that drains from said bed.

11. Apparatus according to claim 10 which comprise oxygen supply means and means for occluding oxygen supplied by said oxygen supply means so as to occur in the ice crystals contained in the ice bed.

12. Apparatus according to claim 10 which comprises cooling means for cooling said gases prior to contact of said gases with ice crystals contained in said ice bed and which also comprises means for removing solid particulate matter from the waste gases prior to contact of said gases with said ice crystals.

13. Apparatus according to claim 12 which further comprises means for mingling water with aqueous melt that drains from said ice bed thereby assisting in the collection and withdrawal of said melt.

14. Apparatus according to claim 12 wherein said cooling means comprises means for spraying water into said waste gases prior to the entry of said waste gases into said ice bed.

15. Apparatus according to claim 12 wherein said cooling means comprises means for directing waste gases cooled by travel through said ice bed and while they are still cold in out-of-contact heat exchange relation with waste gases directed through said ice bed prior to their entry into said ice bed.

16. Apparatus according to claim 10 which also comprises a conditioning chamber disposed underneath said ice bed chamber, means for directing the waste gases upwardly through said conditioning chamber and then through the ice bed in said ice bed chamber, and water spray jet means for directing a spray of water so as to emanate from adjacent the underside of said foramenous support for said ice bed and descend in counter current relation with the upward travel of said gases through said conditioning chamber thereby cooling said gases prior to their entry into the ice bed, directionalizing the flow of the gases through said conditioning chambers so as to be in adjacent relation to the inner surface of said conditioning chamber, and also comingling water comprised in said spray with the melt that drains from said ice bed.

17. Apparatus according to claim 16 which comprises means in adjacent relation to the lower end of said conditioning chamber for separating solid particulate matter from waste gases prior to contact of said gases with spray from said spray jet means.

18. Apparatus according to claim 16 wherein the inner surface of the conditioning chamber is represented by the tubular wall of a passageway disposed about the conditioning chamber, and means for directing gases that have been cooled by travel through said ice bed and that are still cold through said passageway thereby cooling waste gases in contact with the inner surface of the conditioning chamber during travel thereof upwardly through said conditioning chamber prior to entry of said gases into said ice bed.

19. Apparatus according to claim 16 which includes oxygen supply means for introducing oxygen into said ice making machine to increase the amount of oxygen occluded in the ice formed by said ice making machine.

* * * * *